(12) United States Patent
Medford

(10) Patent No.: US 10,852,258 B2
(45) Date of Patent: Dec. 1, 2020

(54) APPARATUS AND METHOD FOR ANALYZING FLAWS IN A TUBULAR MEMBER

(71) Applicant: James S. Medford, Magnolia, TX (US)

(72) Inventor: James S. Medford, Magnolia, TX (US)

( * ) Notice: Subject to any disclaimer, the term of this patent is extended or adjusted under 35 U.S.C. 154(b) by 210 days.

(21) Appl. No.: 16/029,210

(22) Filed: Jul. 6, 2018

(65) Prior Publication Data

US 2019/0017944 A1    Jan. 17, 2019

Related U.S. Application Data

(60) Provisional application No. 62/533,538, filed on Jul. 17, 2017.

(51) Int. Cl.
  *G01N 23/18* (2018.01)
  *G01N 23/083* (2018.01)
  *G01N 23/046* (2018.01)

(52) U.S. Cl.
  CPC ........... *G01N 23/18* (2013.01); *G01N 23/046* (2013.01); *G01N 23/083* (2013.01); *G01N 2223/3303* (2013.01); *G01N 2223/628* (2013.01); *G01N 2223/646* (2013.01)

(58) Field of Classification Search
  CPC ................. G01N 23/083; G01N 23/18; G01N 2223/3303; G01N 2223/628; G01N 2223/646; G01N 23/046
  See application file for complete search history.

(56) References Cited

U.S. PATENT DOCUMENTS

| | | | | |
|---|---|---|---|---|
| 3,445,655 A | * | 5/1969 | Curry | G01N 23/04 378/171 |
| 3,650,514 A | * | 3/1972 | Stunkard | G01N 23/083 266/56 |
| 3,708,662 A | * | 1/1973 | Kurokawa | A61B 6/00 378/179 |
| 3,921,440 A | * | 11/1975 | Toth | G01N 29/265 73/622 |
| 3,938,492 A | * | 2/1976 | Mercer, Jr. | B24B 53/04 125/11.01 |
| 4,284,895 A | | 8/1981 | Morgan et al. | |
| 5,069,234 A | | 12/1991 | Nielsen | |
| 5,107,121 A | * | 4/1992 | Lim | G01T 1/1648 250/363.04 |
| 6,272,200 B1 | * | 8/2001 | Pan | G06T 11/005 378/15 |
| 7,003,070 B1 | * | 2/2006 | Chen | A61B 6/00 378/17 |
| 7,855,381 B2 | | 12/2010 | Yamazaki | |

(Continued)

*Primary Examiner* — Chih-Cheng Kao
(74) *Attorney, Agent, or Firm* — Bushman Werner, P.C.

(57) ABSTRACT

An apparatus for x-ray inspection of a tubular member. The apparatus has a frame comprised of first and second axially spaced split side sections which can be positioned around the tubular member. There is a carousel rotatable mounted on the frame which, like the frame members, is made of split side members which can be positioned around the tubular member. There is an x-ray source and a flat panel x-ray detector mounted on the carousel at a desired circumferentially spaced distance from one another. A driver is mounted on the frame and operatively connected to the carousel to rotate the carousel relative to the frame.

17 Claims, 11 Drawing Sheets

(56) References Cited

U.S. PATENT DOCUMENTS

| | | | |
|---|---|---|---|
| 2005/0041775 A1* | 2/2005 | Batzinger | G01N 23/04 |
| | | | 378/59 |
| 2008/0118024 A1* | 5/2008 | Cho | A61B 6/00 |
| | | | 378/13 |
| 2010/0275694 A1 | 11/2010 | Roberts | |
| 2012/0189094 A1* | 7/2012 | Neushul | A61B 6/4266 |
| | | | 378/19 |

* cited by examiner

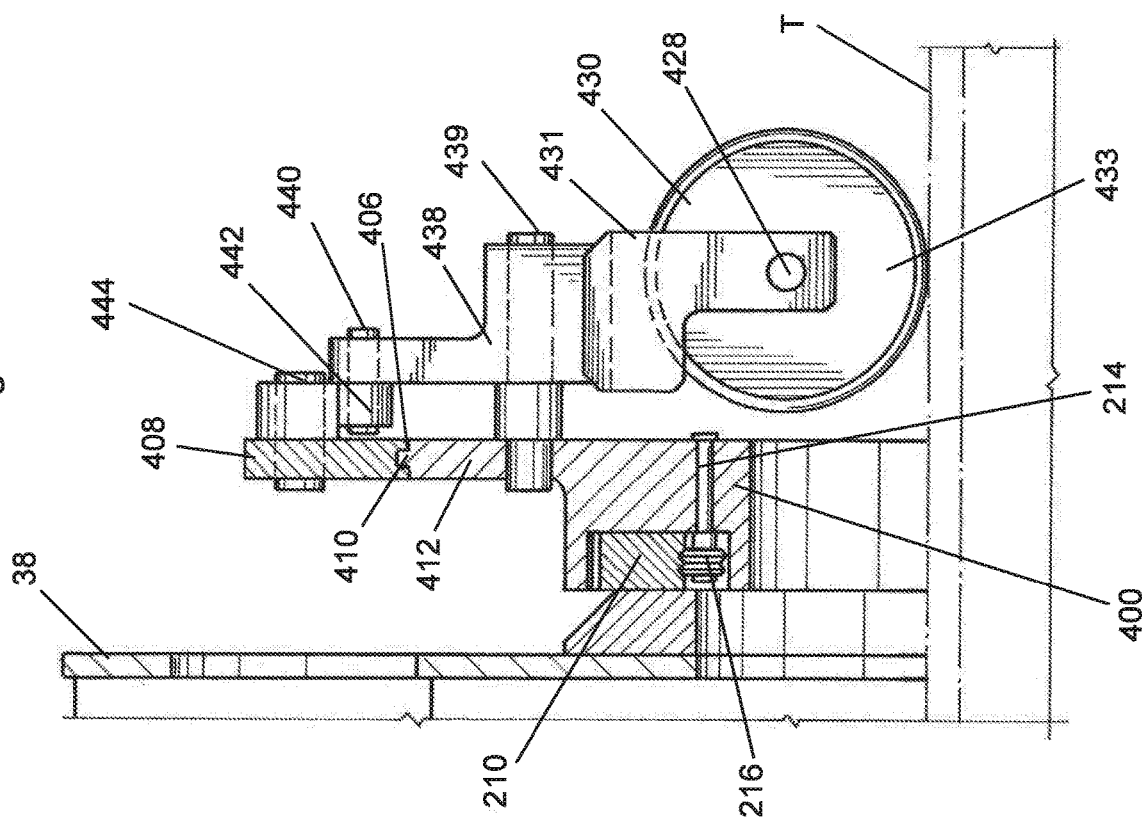
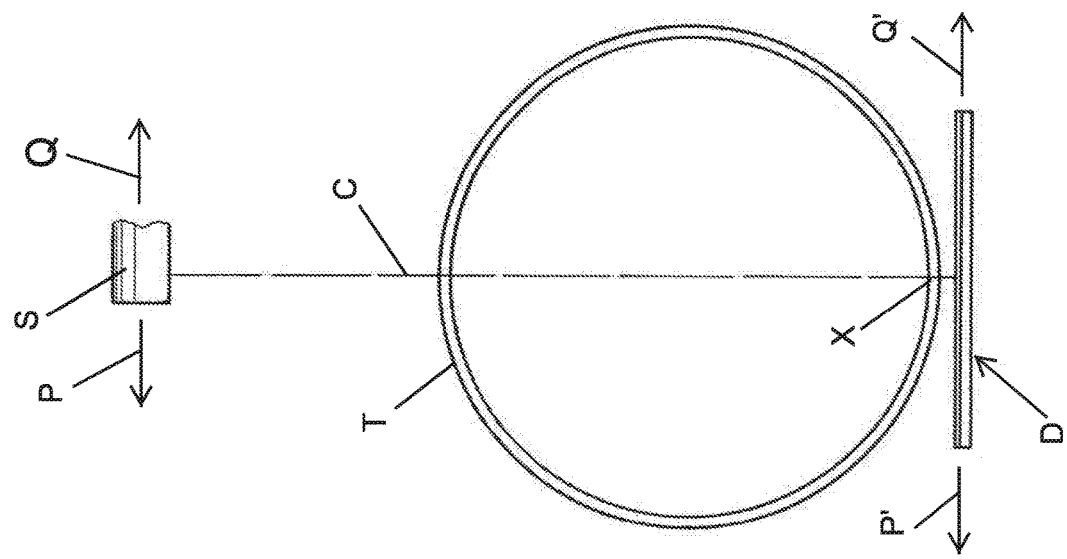

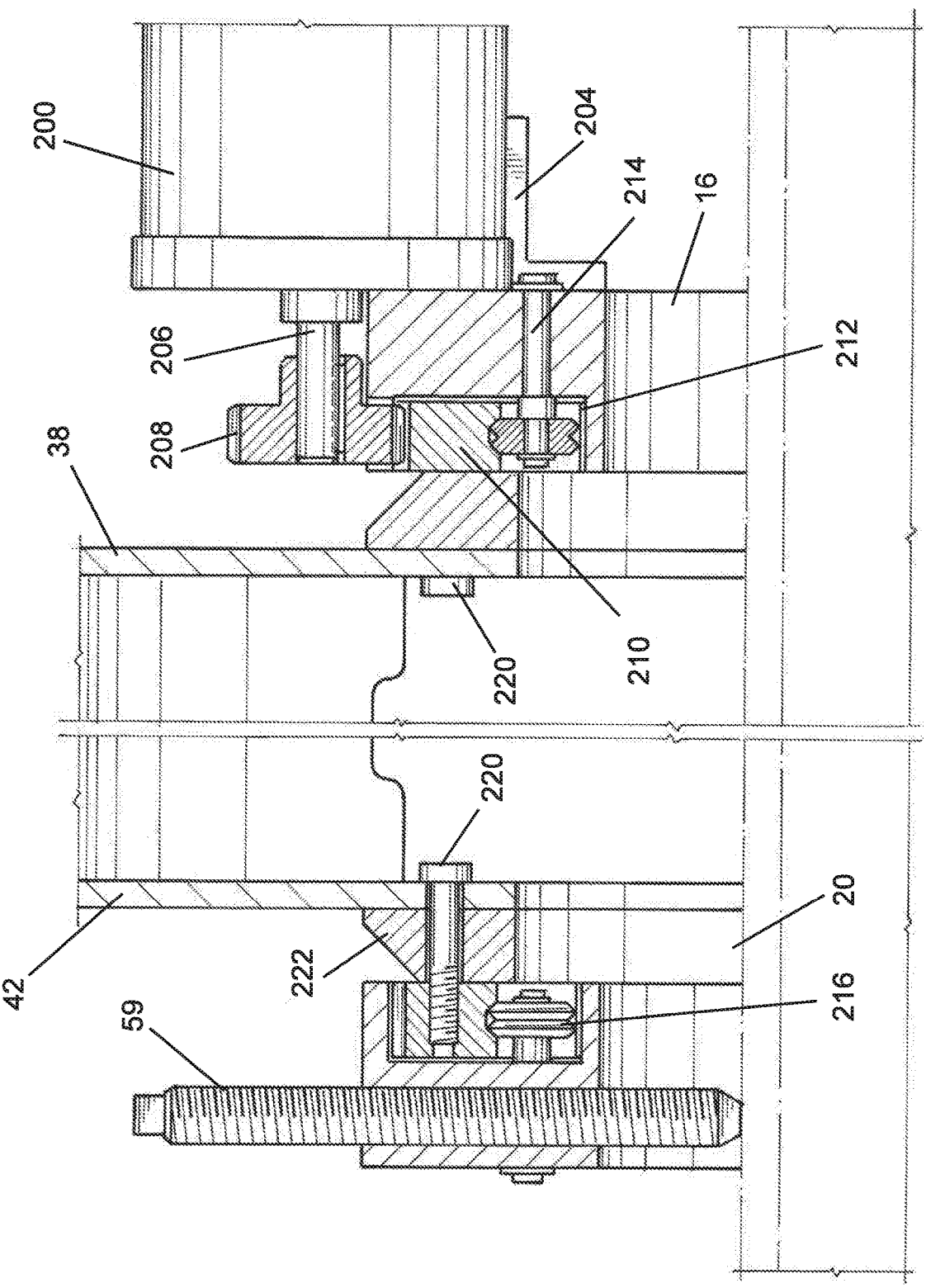

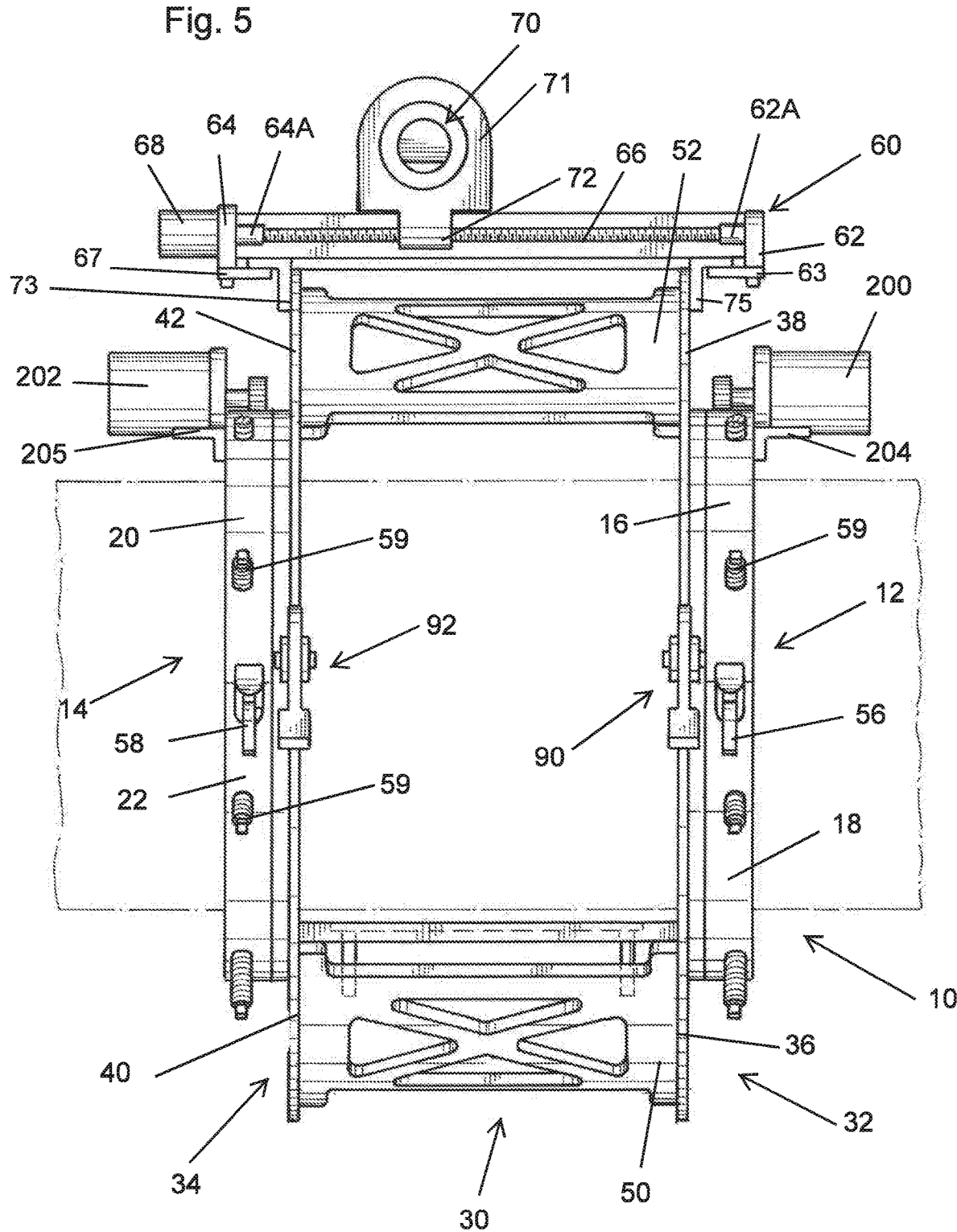

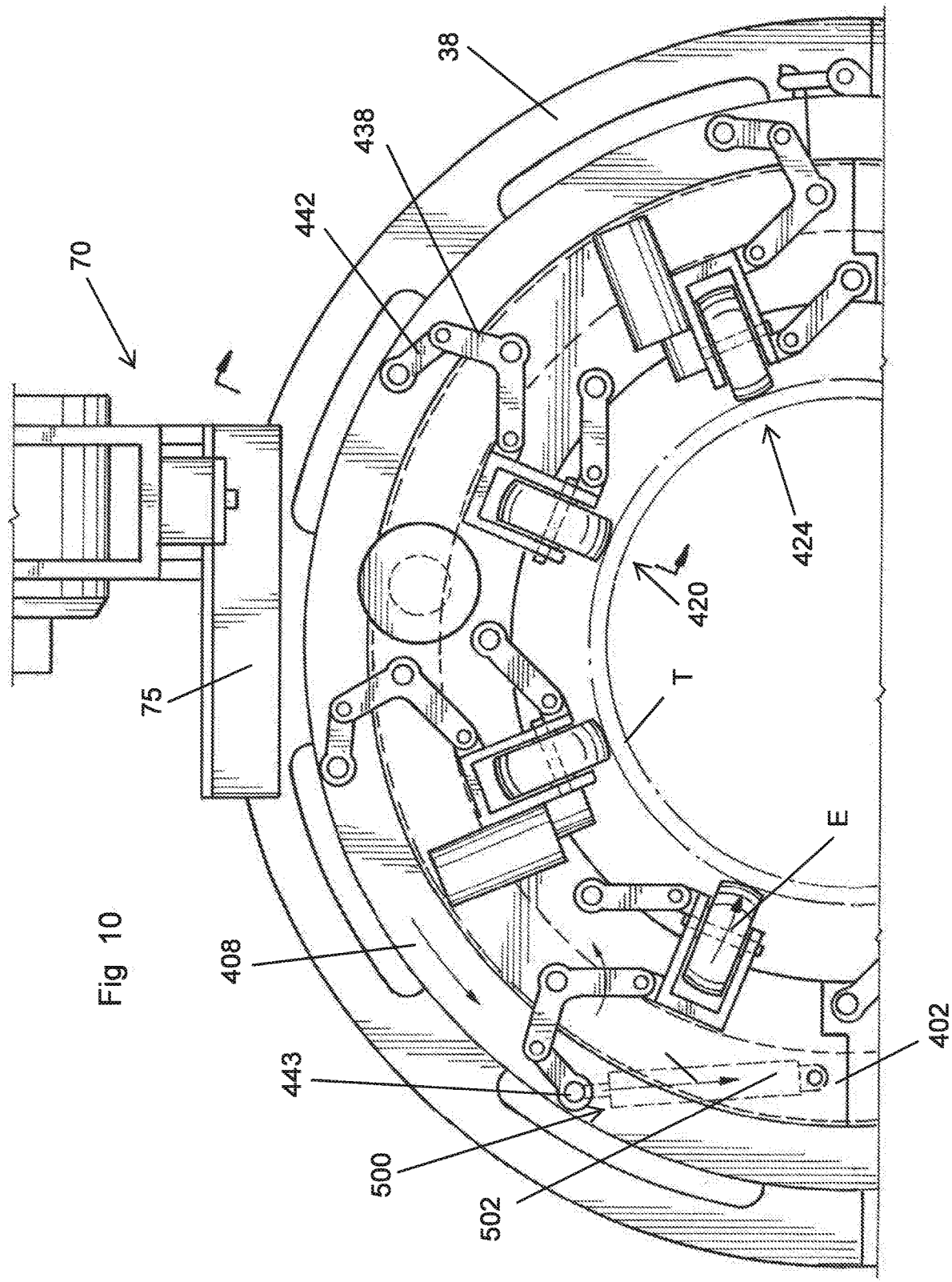

APPARATUS AND METHOD FOR ANALYZING FLAWS IN A TUBULAR MEMBER

CROSS REFERENCE TO RELATED APPLICATION

This application claims priority to U.S. Application No. 62/533,538 filed on Jul. 17, 2017 the disclosure of which is incorporated herein by reference for all purposes.

FIELD OF THE INVENTION

The present invention relates to the inspection of tubular members to analyze flaws or defects such as cracks or pitting in the tubular member, e.g., a pipeline. More particularly, the present invention relates to a method and apparatus for evaluating flaws in a pipeline after an in-line inspection.

BACKGROUND OF THE INVENTION

Throughout the world, there are millions of miles of pipeline carrying everything from water to crude oil. Pipelines are vulnerable to attack by internal and external corrosions, cracking, third party damage, and manufacturing flaws. While a leak from a water pipeline is unlikely to cause significant environmental damage, a leak from a pipeline carrying hydrocarbons or chemicals can create an environmental disaster. For example, if the pipeline is carrying natural gas, a leak can lead to a catastrophic explosion. In an attempt to keep pipelines operating safely, periodic inspections are performed to find flaws before they become a cause for concern.

In the case of buried pipelines, it is common to conduct in-line inspection (ILI) by a technology referred to as "smart pigging". In this regard, engineers have developed devices called pigs that are sent through buried pipe to perform inspections. Generally, the pigs are carried through the pipe by the flow of the liquid or gas and can travel or perform inspections over very large distances. Typically, the pigs carry a small computer to collect, store, and transmit data for analysis.

Pigs typically use ultrasonics or electro-magnetic acoustics to perform the inspections. In this regard, the measurements from these tools historically have been found to be inaccurate by as much as 50% or more. Direct assessment methods used today are Phased Array Ultrasonics, and Manual Ultrasonics testing. These non-destructive methods are capable of detecting the pipe wall anomalies/flaws, however they are incapable of accurately sizing an anomaly/flaw in all three dimensional planes, e.g., length (X), width (Y), and depth (Z). In point of fact, the Z dimension is the most important since it shows how far the flaw extends between the inner and outer surfaces of the pipeline.

Accordingly, once a pig determines an anomaly exists in a pipeline, in order to determine mitigation activities, the operator must know the full details of the flaw. To date, that has only been achieved by removal of the pipe section and assessment in a laboratory, oftentimes only to learn that the flaw was not a material defect. In this regard, it is known that X-ray Computed Tomography (XCT) has been used in the laboratory to investigate pitting and cracking in samples from oil/gas pipelines, bridges, aircraft, chemical plants, power plants, and other civil engineering structures to determine the X, Y, and Z morphology of the flaw.

SUMMARY OF THE INVENTION

In one aspect, the present invention relates to an apparatus for analyzing flaws in a tubular member, particularly a metallic tubular member.

In another aspect, the present invention relates to an apparatus for conducting in situ analysis of infrastructures such as buried pipelines to assess flaws in the structure.

In still another aspect, the present invention relates to a method for analyzing flaws in a structure, in situ, to determine the three-dimensional morphology of a flaw, e.g., a crack.

These and further features and advantages of the present invention will become apparent from the following detailed description, wherein reference is made to the figures in the accompanying drawings.

BRIEF DESCRIPTION OF THE DRAWINGS

FIG. 1 is a schematic depiction of the relative position of an x-ray tube and a flat panel detector in relation to a tubular member to be inspected according to the method of the present invention.

FIG. 3 is a cross-sectional view taken along the lines 3-3 of FIG. 2.

FIG. 4 is a cross-sectional view taken along the lines 4-4 of FIG. 2.

FIG. 5 is a front, elevational view of the embodiment of the inspection apparatus shown in FIG. 2.

FIG. 10 is a view similar to FIG. 9 showing the translation assemblies of FIG. 9 in driving engagement with a tubular member.

FIG. 11 is a partial, front elevational view, partly in section, showing one of the translation assemblies used in the embodiment of FIG. 9.

DETAILED DESCRIPTION OF PREFERRED EMBODIMENTS

Referring first to FIG. 1 there is shown one arrangement of an x-ray source and a flat panel detector plate in relation to a tubular member to be inspected using the method and inspection apparatus of the present invention. The x-ray source S is positioned, in the schematic shown in FIG. 1, diametrically opposite detector D which emits an x-ray beam which can be a cone beam shown generally as having a centerline C which is focused on the area of interest X on the tubular member T. In use, the detector plate D is positioned relative to the tubular member T such that the x-ray cone spread on detector plate D is as large as possible. In the method and apparatus of the present invention, the source S and the detector D are always centered on one another. Thus, while tubular member T may or can be off center to the source S and the detector D, depending upon the O.D. of tubular member T, the source S and detector D remain centered upon one another.

It will also be recognized, that the source S can be moved or shifted in a right or left direction as viewed with respect to FIG. 1 and as indicated by the arrows P, Q. This same freedom of movement in detector D can also be done as shown by the arrows P', Q'. For example, in the case of large diameter pipe, the detector would generally be shifted to the left or right, i.e., the center of the detector D would not lie on the diameter of the tubular member.

It will also be recognized that the source S can be moved vertically, again with reference to viewing FIG. 1, such that the source S is further away or closer to the tubular member T thereby spreading or coalescing the spread of the ray cone from the source S on the tubular member T and the detector D.

Figure 2:
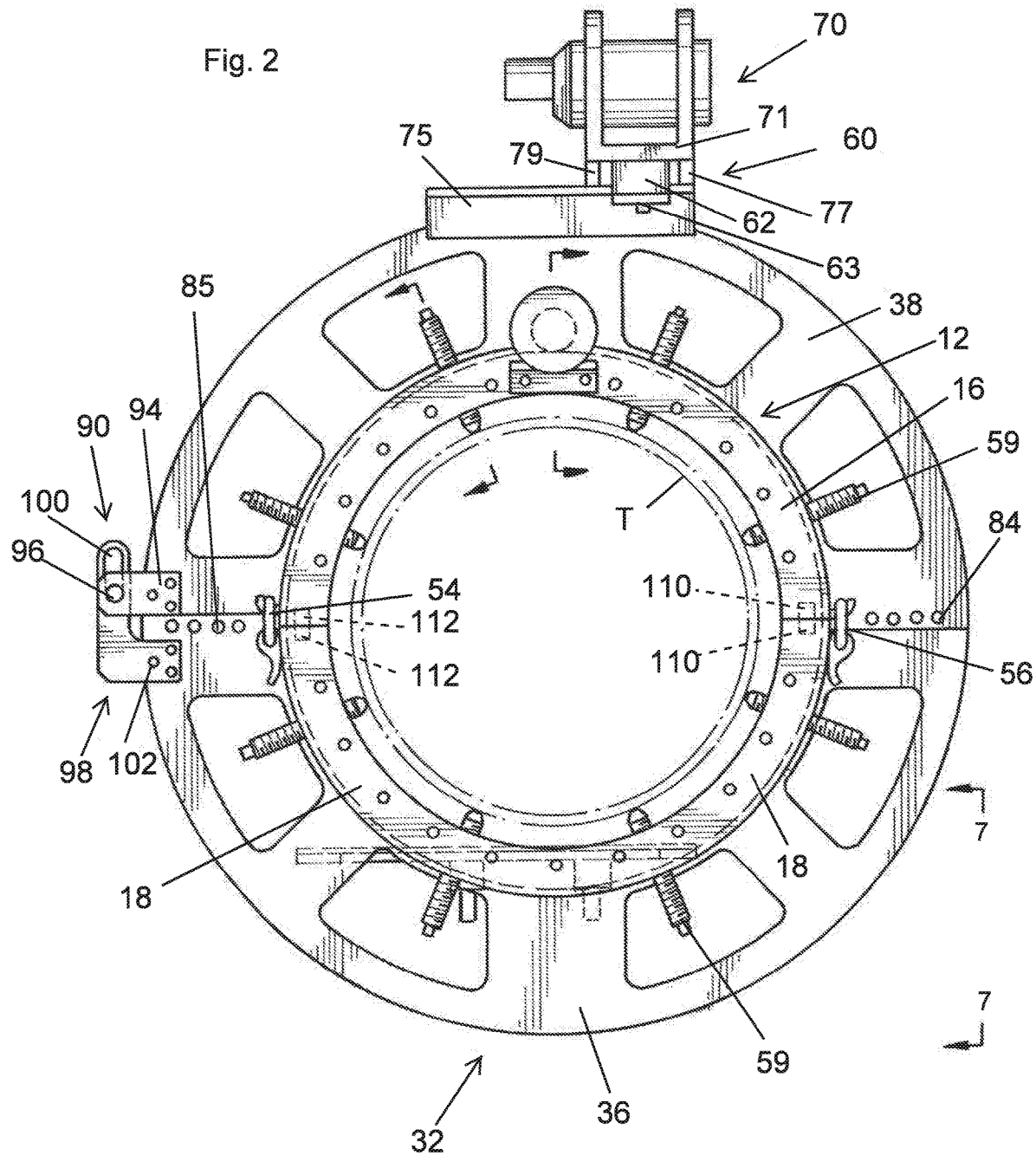
FIG. 2 is a side, elevational view of one embodiment of the tubular member inspection apparatus of the present invention in a fixed position on a tubular member.

Referring first to FIGS. 2 and 5, the pipe inspection apparatus of the present invention shown generally as 10 comprises first and second, axially spaced, annular frame members shown generally as 12 and 14. Frame member 12 has first and second frame segments 16 and 18 while frame member 14 has first and second frame segments 20 and 22.

There is a carousel, shown generally as 30, which has first and second axially spaced, annular rims or side sections shown generally as 32 and 34. Rim 32 which is connected to frame member 12 has first and second segments 36 and 38 while rim 34 which is connected to frame member 14 has first and second segments 40 and 42. Rim segments 36 and 40 are connected together by two spacers/braces, only one of which, spacer 50 is shown. Likewise, segments 38 and 42 are connected together by two spacers or braces, only one of which, spacer 52, is shown. A pair of adjustable, releasable toggle clamps 54 and 56 hold rim segments 36 and 38 together. In like fashion, a similar pair of clamps, only one of which is shown, clamp 58, hold rim segments 40 and 42 together.

As best seen in FIG. 2, there are a plurality of circumferentially spaced threaded grippers 59 which, as shown in this embodiment, are elongated set screws, which are received through threaded throughbores in frame members 12 and 14 and which, as seen, can be selectively adjusted so as to engage and position the frame members 12 and 14 around the outer wall of tubular member T. The number, type, and spacing of grippers 59 can be varied, the only proviso being that if it is desired to position inspection apparatus 10 concentrically with respect to tubular member T, there would generally be at least three such grippers 59, preferably spaced approximately 120° apart. It will be understood that any type of gripping or centering assemblies can be used to engage the pipe to be examined. As best seen with reference to FIG. 2, when the rim segments 36, 38 and 40, 42 are connected using clamps, e.g., clamps 54, 56, and 58, the frame members 12, 14 and rims 32, 34 effectively form a cage like structure in surrounding relationship to tubular member T.

Interconnected to rim segments 38 and 42 is an x-ray source carrier shown generally as 60. Carrier 60 is comprised of first and second axially spaced trunnions or mounts 62 and 64 having socket members 62A and 64A, respectively, socket members 62A and 64A rotatably receiving opposite ends of a threaded rod 66. Operatively attached to threaded rod 66 is a stepper motor 68, which can rotate rod 66. An x-ray source, shown generally as 70 is mounted in a cradle 71. Cradle 71 includes a collar 73 which is internally threaded and which receives threaded rod 66 in a rack and pinion type arrangement. Accordingly, it will be appreciated that if stepper motor 68 rotates rod 66, cradle 71 and hence x-ray source 70 will be moved longitudinally along rod 66.

As best seen in FIG. 5, attached to rims 32 and 38 are angle irons 73 and 75, respectively. Bolted to trunnions 62 and 64 are plates 63 and 67 which extend under one leg of the angle irons 75 and 73, respectively. There are a pair of cross members 77 and 79 connected at their opposite ends to trunnions 62 and 64. The cross members 77, 79 form a track or rail on which carrier 71 rides as x-ray source 70 is moved along the length of threaded rod 66. It will be understood that by suitable shimming the x-ray source 70 could be moved further, laterally outwardly from the rims. Further, it will be appreciated that the x-ray source could be suitably mounted so as to be nearer, indeed between the rims.

In FIG. 2, the inspection apparatus of the present invention is shown in its assembled condition. As best seen with reference to FIG. 6, in the disassembled condition, respective pairs of the frame segments and the rim segments are generally semicircular and accordingly have surfaces or faces which when apparatus 10 is assembled are in abutting relationship with one another. The abutting diametric faces of the rim segment pairs 36, 38 and 40, 42 have overlapping leaf formations (see FIG. 6), 76 and 78, which are diametrically opposite leaf formations 80 and 82. Each of the leaf formations has a series of holes which when the abutting faces of rim segments 36 and 38 are brought together in abutting relationship are in register whereby nut/bolt combinations 84 and 86 can be received in the registering bores to connect the segments 36 and 38. It will be understood that a like structure is also present on rim segments 40 and 42. As can also be seen with reference to FIG. 2, each pair of rim segments are also connected by releasable clamps 54 and 56. Further, each of the rim segments carrying a hinge assembly shown generally as 90 and 92, the hinge assemblies comprising a bracket 94 secured to rim segment 38 by nut and bolt combinations. Bracket 94 extends laterally outwardly from the periphery of rim segment 38 and carries a pivot pin 96. An L-shaped hinge member 98 has an elongate slot 100 through which pivot pin 96 is received. As seen in FIG. 2 in the assembled position, one leg of hinge member 98 is secured to rim segment 36 by means of nut and bolt assembly 102.

Figure 6:
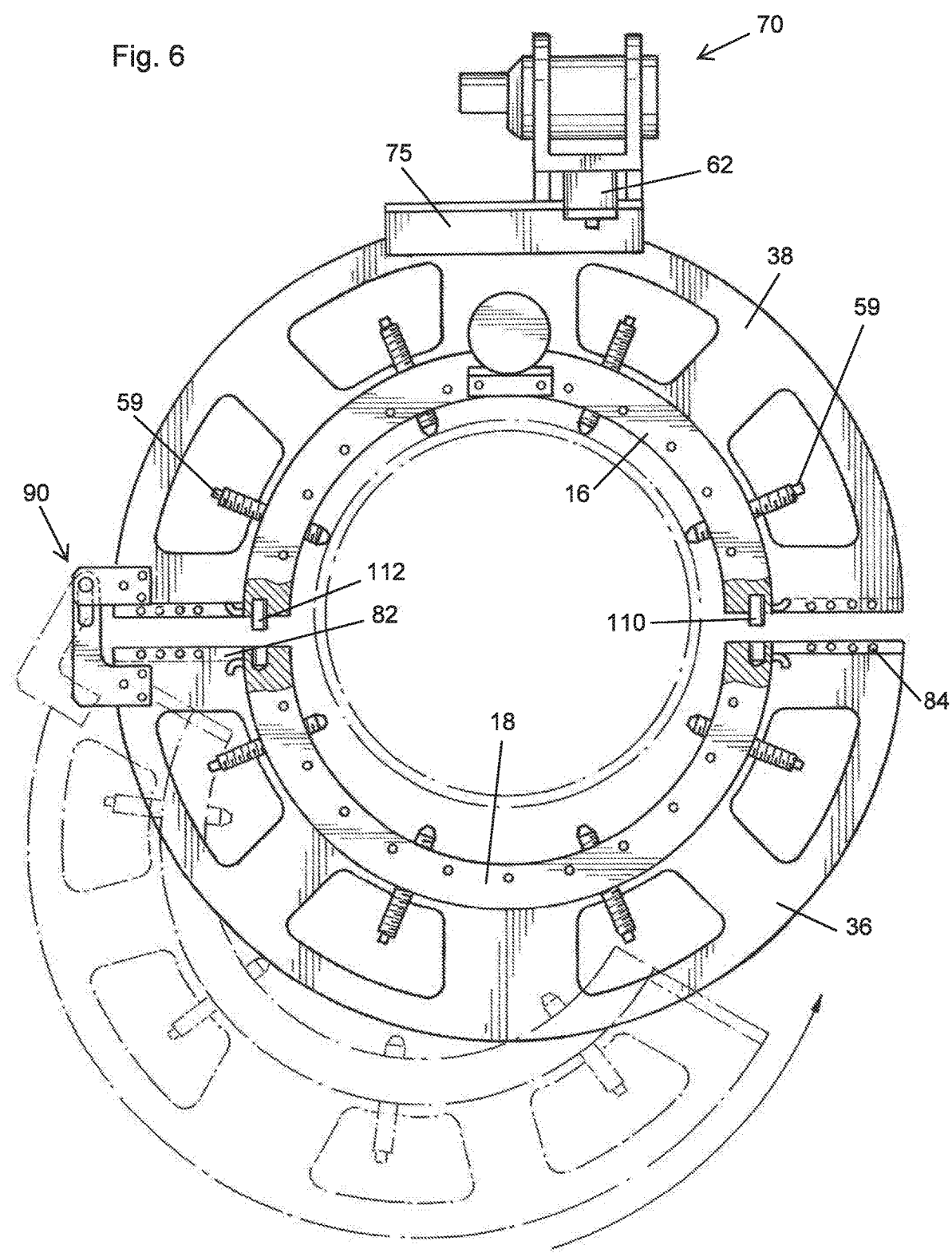
FIG. 6 is an elevational view, similar to FIG. 2, showing the two sections of one embodiment of the tubular member inspection apparatus of the present invention.

Referring now to FIG. 6, it can be seen that if the nut and bolt assemblies 84 are removed, leaves 76 and 78 can be separated. In like fashion, if the nut and bolt assemblies 85 in the overlapping leaves 80 and 82 are removed, and further if the nut and bolt assemblies 102 are removed from L-shaped hinge member 98, rim segment 38 can be separated at the abutting surfaces and segment 38 can be pivoted around pin 96 to allow the apparatus to be removed from its surrounding relationship to tubular member T as seen in FIG. 6.

As seen in FIG. 6, frame members 16 and 18 on their diametric abutting faces have registering bores in which are received dowel pins 110 and 112, respectively. The dowel pins 110 and 112 assure proper alignment when assembling the apparatus of the present invention in surrounding relationship to a tubular member.

It will be apparent from the description given above, that while the frame members are stationary when the inspection apparatus is connected in surrounding relationship to tubular member T, the carousel 30 can be caused to rotate relative to the frame member as described hereafter.

Reference is now made to FIGS. 3, 4, and 5. As shown in FIG. 5, there are first and second motors 200 and 202 connected by brackets 204 and 205 to frame segments 16 and 20, respectively. As can be seen in FIG. 4, motor shaft 206 is connected to a spur gear 208. Spur gear 208 engages a ring gear 210 which is positioned in an annular recess 212 of frame segment 16. There are a plurality of circumferentially spaced axles 214 extending through frame segment 16 on which are mounted rollers 216.

Rim segment 20 is connected to ring gear 210 via a series of circumferentially spaced bolts 220 extending through an annular spacer plate 222, bolts 220 being received in circumferentially spaced threaded bores in ring gear 210. A like arrangement appears with respect to the motor 202 and rim segment 42. Thus, as motor 200 rotates shaft 206 and spur gear 208, the engaged teeth of spur gear 208 and ring gear 210 drive ring gear 210 which rides on rollers 216. Since ring gear 210 is connected to rim segment 38, the result is rotation of rim 32. This same construction and method of operation also describes the action of motor 202 and the rotation of rim 34.

Figure 13:
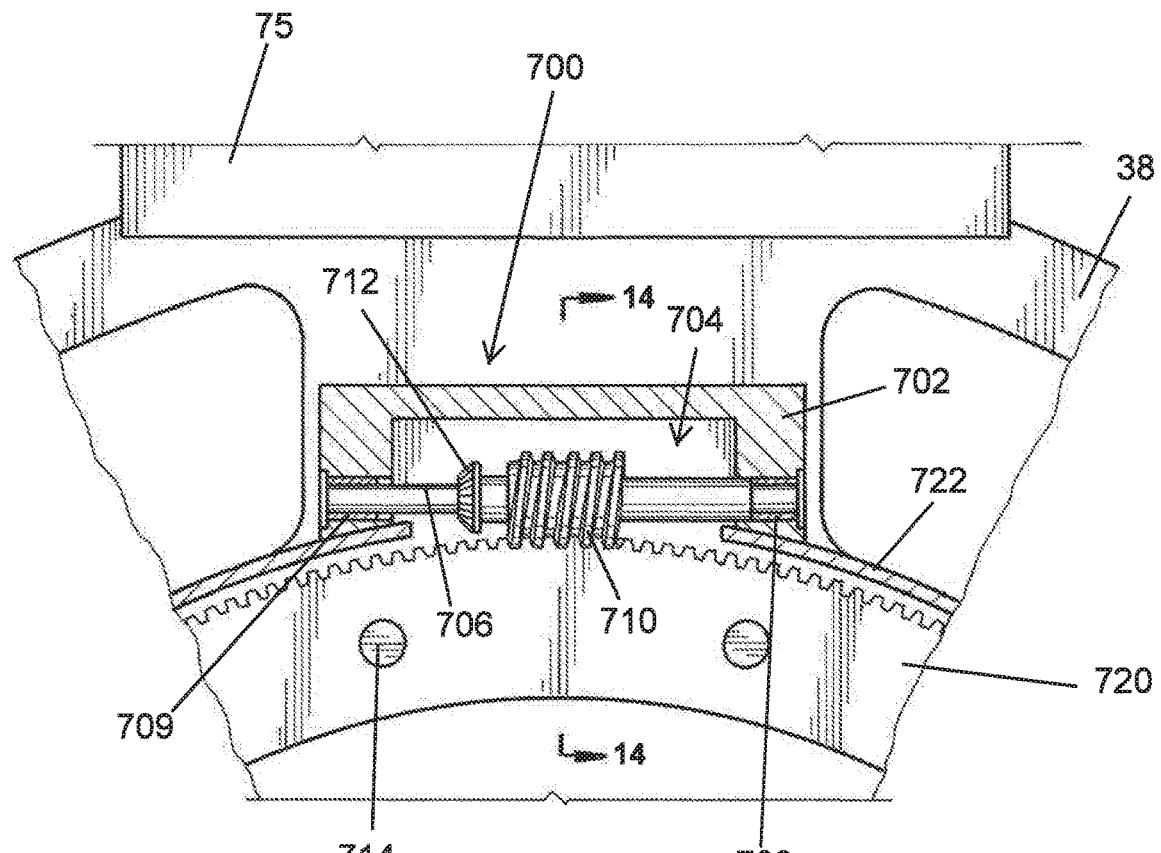
FIG. 13 is a partial, elevational view, partly in section, showing a drive assembly for rotating the carousel.
Figure 14:
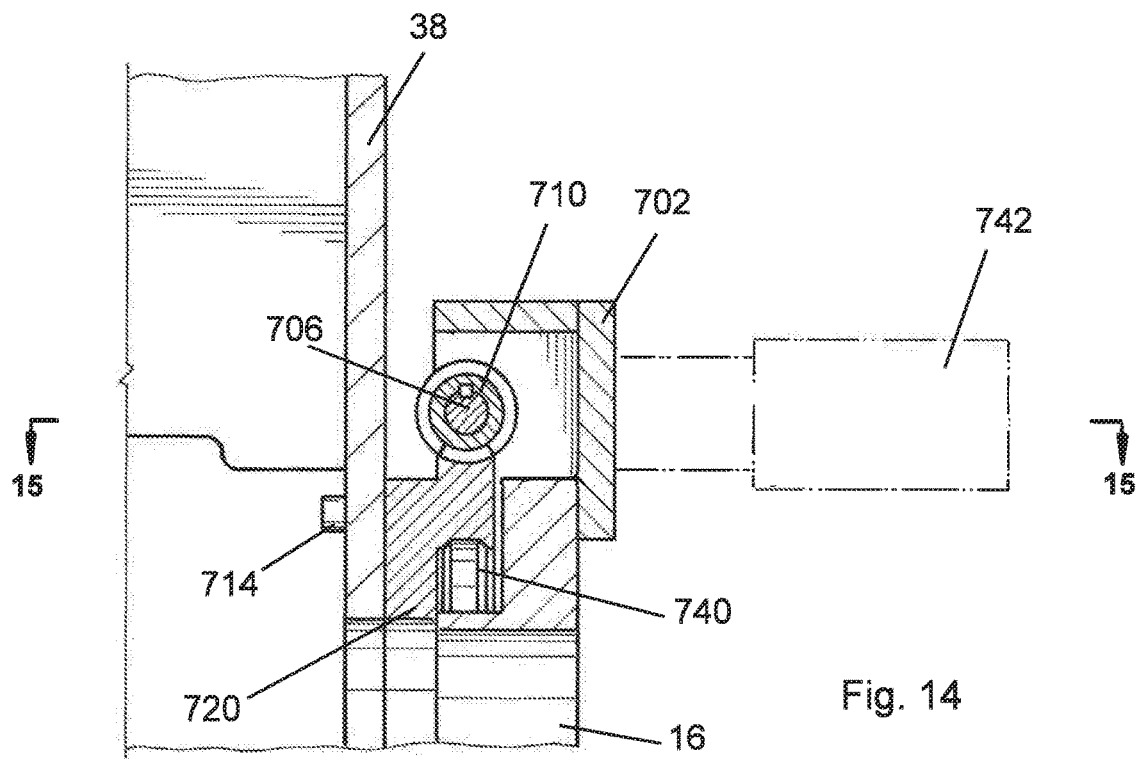
FIG. 14 is a view taken along the lines 14-14 of FIG. 13.
Figure 15:
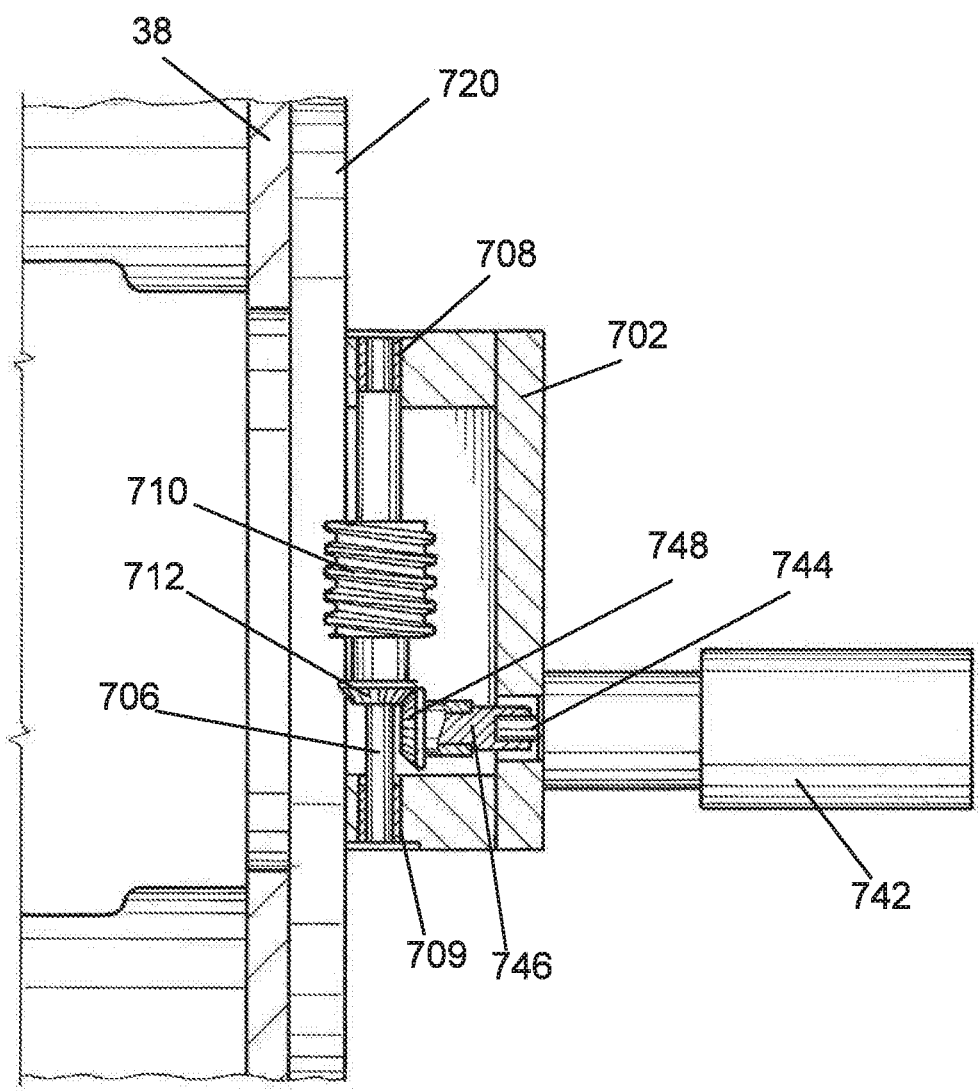
FIG. 15 is a view taken along the lines 15-15 of FIG. 14.

Turning to now to FIGS. 13-15, there is shown an alternate drive assembly for use in rotating the rims, e.g., rim 32. It should be understood that while the description which follows applies only to rim 32, it is equally applicable to rim 34. Turning then to FIG. 13, a worm drive assembly shown generally as 700 is depicted. Worm drive assembly 700 comprises a gear box 702 in which is rotatably journaled a worm assembly shown generally as 704. Worm 704 comprises a shaft 706, the ends of which are rotatably journaled in bearings 708 and 709. A worm screw 710 and beveled gear 712 are mounted on and are rotatable with shaft 706. Connected to rim 32 by bolts is a worm wheel 720, the teeth of which are engageable with the teeth of worm screw 710. A substantially annular shroud 722 overlies worm wheel 720, shroud 722 being connected to gear box 702.

As shown in FIG. 14, gear box 702 is connected to frame 16. As can also be seen worm wheel 720 is connected to rim segment 38. FIG. 14 also depicts how the worm screw 710 is keyed to shaft 706. Worm wheel 720 rides on a plurality of circumferentially spaced rollers 740, only one of which is shown in FIG. 14. For clarity, there is shown a motor 742 which as best seen in FIG. 15 drives worm screw 710.

Turning then to FIG. 15 it can be seen that motor 742 is connected to gear box 702 and has a drive shaft 744 which is connected to the beveled gear shaft 746 of beveled gear 748. It can thus be seen that as motor 742 rotates shaft 746, beveled gear 748 engaged with beveled gear 712 drives shaft 706 and accordingly worm screw 710 which in turn drives worm wheel 720. It will be understood that the worm drive arrangement shown in FIGS. 13-15 may be desirable in lieu of the drive assembly shown in FIG. 4 since it has the advantage of transmitting higher torque. However, it is to be understood that any drive assembly can be used to rotate carousel 30. Further, it is to be understood that while the drive system described above, e.g., FIGS. 4 and 13-15, contemplates a drive assembly on each rim, in certain cases only a single drive system on one rim can be used.

Figure 7:
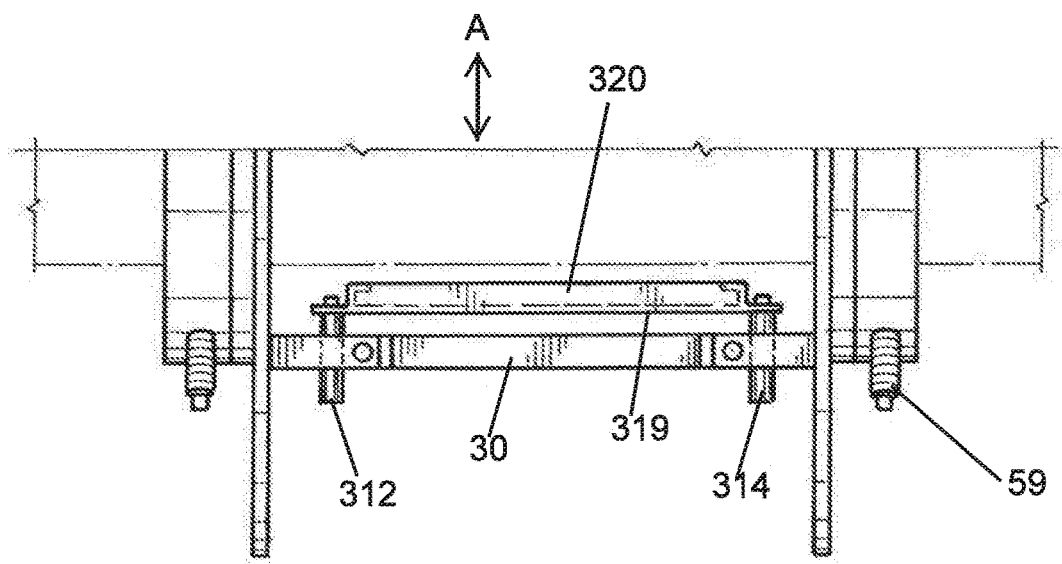
FIG. 7 is an elevational taken along the lines 7-7 of FIG. 2 and showing a flat panel x-ray detector plate mounted to the inspection apparatus shown in FIG. 2.
Figure 8:
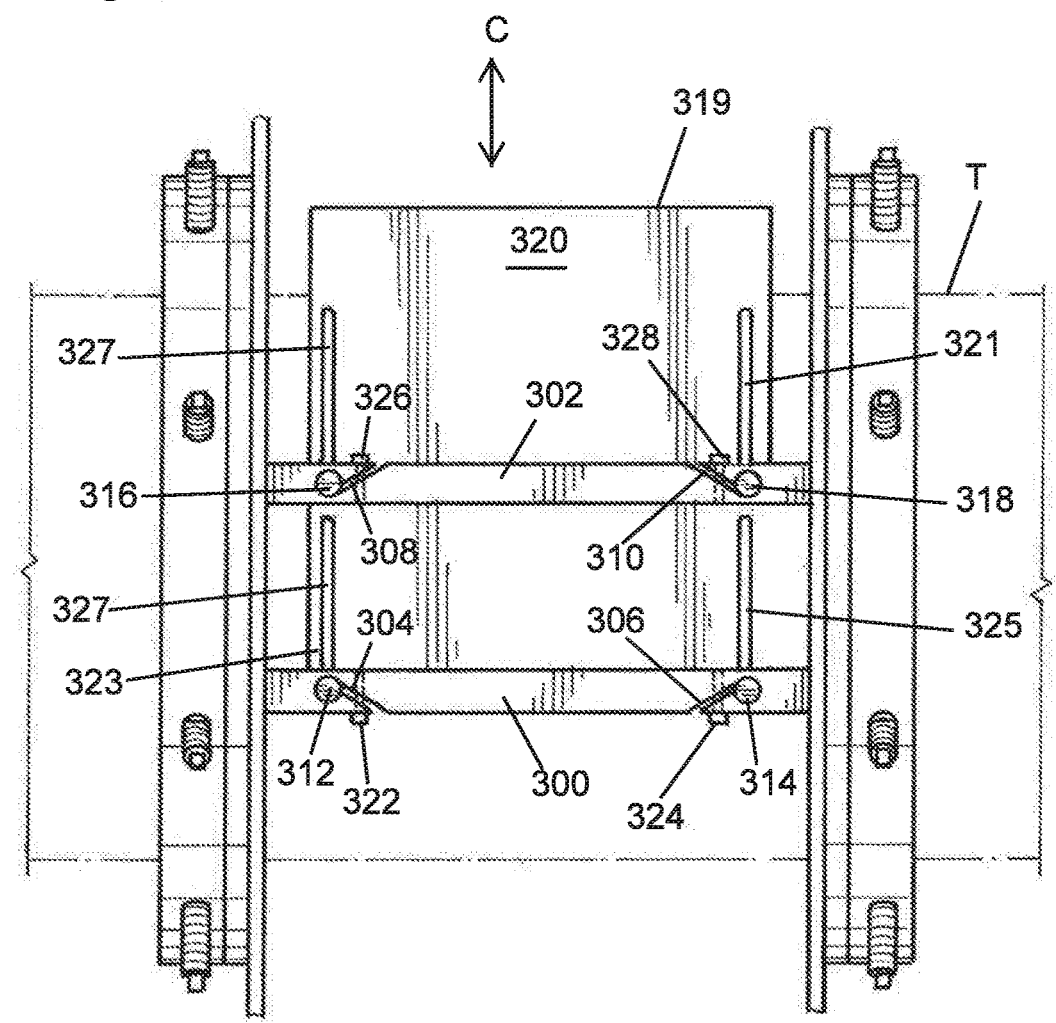
FIG. 8 is a top plan view of the mounting of the x-ray flat panel detector shown in FIG. 7.

Turning now to FIGS. 7 and 8, there is shown a connection of a flat panel x-ray detector to the carousel 30 of the present invention. Two circumferentially spaced crossbars 300 and 302 are connected at their opposite ends to the spaced rims of carousel 30. The bars 300 and 302 have angled slots 304, 306, and 308, 310, respectively. Crossbar 300 is connected to laterally spaced posts 312 and 314 while crossbar 302 is connected to laterally spaced posts 316 and 318. As can best be seen in FIG. 8, posts 312, 314, 316, and 318 project through bores which are in open communication with slots 304, 306, 308, and 310. Slidably mounted on the posts in a frame 319 on which is mounted an x-ray flat panel detector plate 320. The position of the x-ray detector plate 320 relative to tubular member T will vary depending on parameters such as the diameter of the tubular member T, the area of the tubular member T is to be examined, etc. Accordingly, in some cases the x-ray detector plate 320 will be as close as possible to the outer wall of tubular member T, while at other times it will be at some predetermined distance from the circumference of tubular member T. Thus, the x-ray detector plate 320 can be selectively positionable relative to tubular member T, not only with respect to its lateral positioning as discussed above with respect to FIG. 1, but also its radial distance from tubular member T. To this end, four adjustment bolts, 322, 324, 326, and 328 are received in respective bores to extend through slots 304, 306, 308, and 310, respectively. When the adjustment bolts 322, 324, 326, and 328 are loosened, it will be apparent that they will allow the slots to expand slightly whereby the frame 319 connected to the post can move in the directions indicated by arrow A of FIG. 7. In other words, the flat panel detector can be moved closer or further away from tubular member T. Once positioned in the desired location, the adjustment screws 322, 324, 326, and 328 can then be tightened to hold frame 319 and hence the flat panel x-ray detector in position.

As discussed above, it is also preferable for detector plate 320 to be adjustable in the directions of arrow C, i.e., transversely with respect to tubular member T. In this regard, frame 319 has opposed side flanges 321 and 323 in which are formed longitudinally extending slots 325 and 327, respectively. Accordingly, when adjustment bolts 322, 324, 326, 328 are loosened, the posts and hence frame 319 to which the posts are attached, are free to move in the direction of arrow C so as to properly position detector plate 320 with respect to tubular member T.

Figure 9:
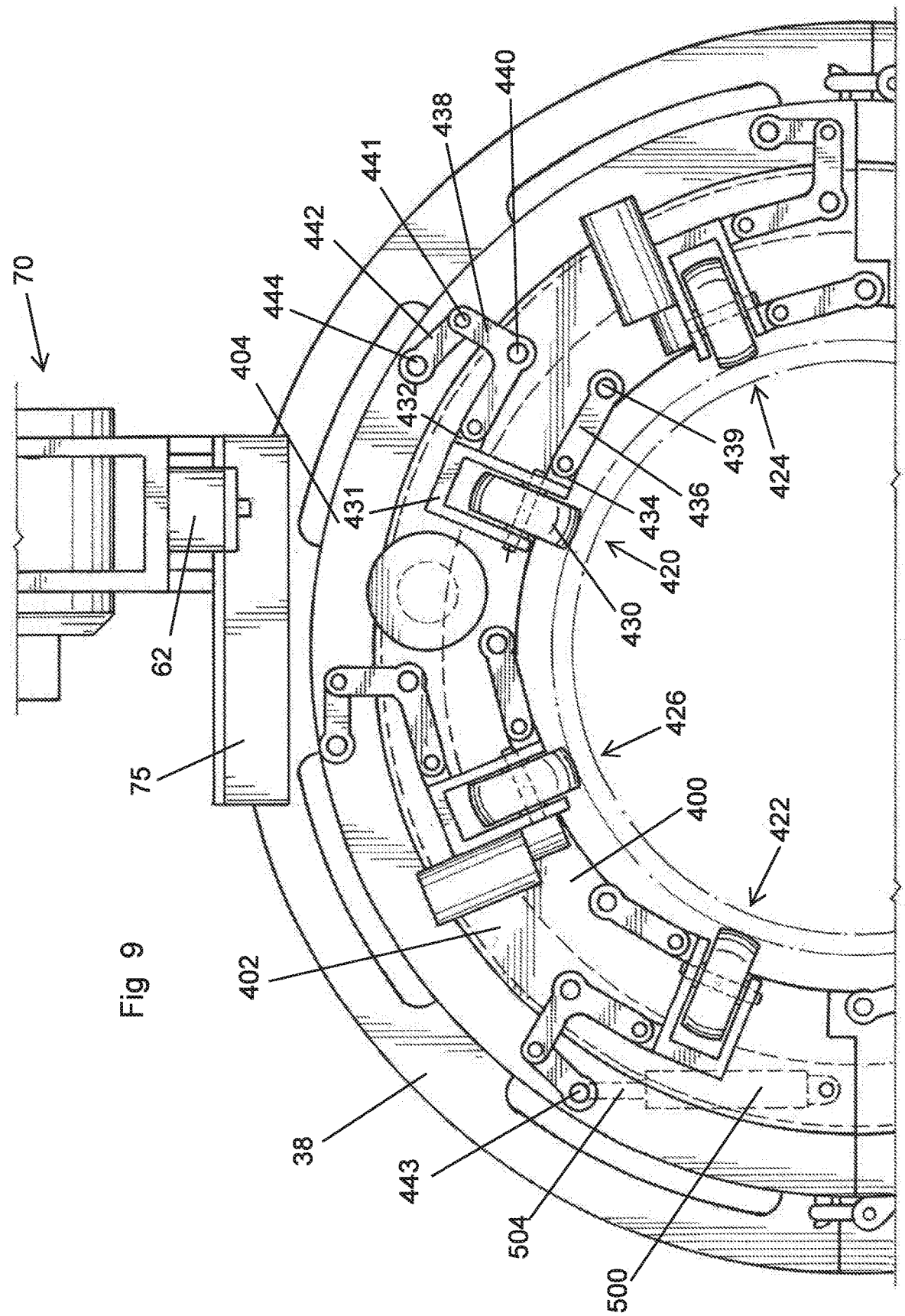
FIG. 9 is a partial, side elevational view of another embodiment of the tubular member inspection apparatus of the present invention showing assemblies for gripping and moving the tubular member inspection apparatus longitudinally along the tubular member.

Referring now to FIGS. 9, 10, and 11, there is shown another embodiment of the invention wherein the grippers used to grab the tubular member T also include driving mechanisms for translating the apparatus 10 along the length of the tubular member T. For purposes of brevity, only a segment of one side of the frame/carousel will be described, it being understood that the other side is the same. Turning now to FIGS. 9 and 11, it can be seen that frame segment 400 has a radially outwardly extending, annular flange portion 402, flange portion 402 having an annular, radially outwardly projecting tongue 406. An outer ring segment 408 has an annular, radially inwardly extending groove 410 which is complementary to tongue 406. Thus ring segment 408 and flange portion 402 are precluded from relative lateral movement. However, ring 408, as seen hereinafter has limited relative rotational freedom relative to flange 402.

There are two idler roller assemblies shown generally as 420 and 422, and two driven roller assemblies shown generally as 424 and 426. First with respect to the idler roller assemblies, reference will be made to idler roller assembly 420, it being understood that for all intents and purposes, idler roller assembly 422 is the same. Idler roller assembly 420 comprises a roller 430 rotatably carried by an axle 428 mounted in a fork 431. Fork 430 has upper and lower ears 432 and 434. Pivotally connected to ear 434 is a link 436 which is also pivotally connected to a pin 439 carried by frame segment 400. Pivotally connected to ear 432 is a generally L-shaped link 438, link 438 being positioned on a pivot pin 440 anchored in flange portion 402. L-shaped link 438 is pivotally connected to a link arm 442 which in turn is pivotally mounted on a pin 444 anchored in ring 408. Link 442 is pivotally connected to pin 444 and to L-shaped link 438 by means of the pivot pin 441.

In the embodiment shown in FIG. 10, the grippers/rollers 430 are in gripping engagement with tubular member T. To accomplish this, there is a piston cylinder assembly 500, the cylinder 502 being pivotally secured to the flange portion 402 of ring segment 400. The piston 504 has a distal end which is pivotally connected to a pivot pin 444. As can be seen from comparing FIGS. 9 and 10, when piston 504 is moved in the direction of arrow B, shown in FIG. 10, outer ring 408 is rotated in the direction of arrow C, the parallelogram type linkage system described above forcing the roller assemblies comprised of forks 431 and rollers 430 into engagement with tubular member T. This motor can be seen with respect to arrow E. It will be understood that while the degree of rotation of ring 408 relative to flange 402 is limited it is sufficient to allow the linkage system to force the rollers 430 into gripping engagement with the outer wall of tubular member T.

As noted above, roller assemblies 420 and 422 are idler rollers while rollers assemblies 424 and 426 are driven roller assemblies. Referring then to FIG. 10, driven roller assembly 424 will be described, it being understood that driven roller assembly 426 is of like construction. As in the case of the idler roller assemblies, the driven roller assemblies have the same linkage interconnecting the fork of the roller assemblies and ring 408. Mounted on ring segment 400 is a gear motor 560 which has a shaft (not shown) connected to a face gear assembly in a gear box 562, the face gear assembly being in turn connected to shaft 564 which in turn is fixedly connected to roller 566 whereby rotation of motor 560 via the face gear assembly in gear box 562 rotates shaft 564 and hence roller 566. Accordingly, when the motors 560 are activated, the driven rollers 566 which are in gripping engagement with the outside wall of tubular member T will translate the inspection apparatus along the length of tubular member T. The motors can be battery powered and activated by remote control.

Figure 12:
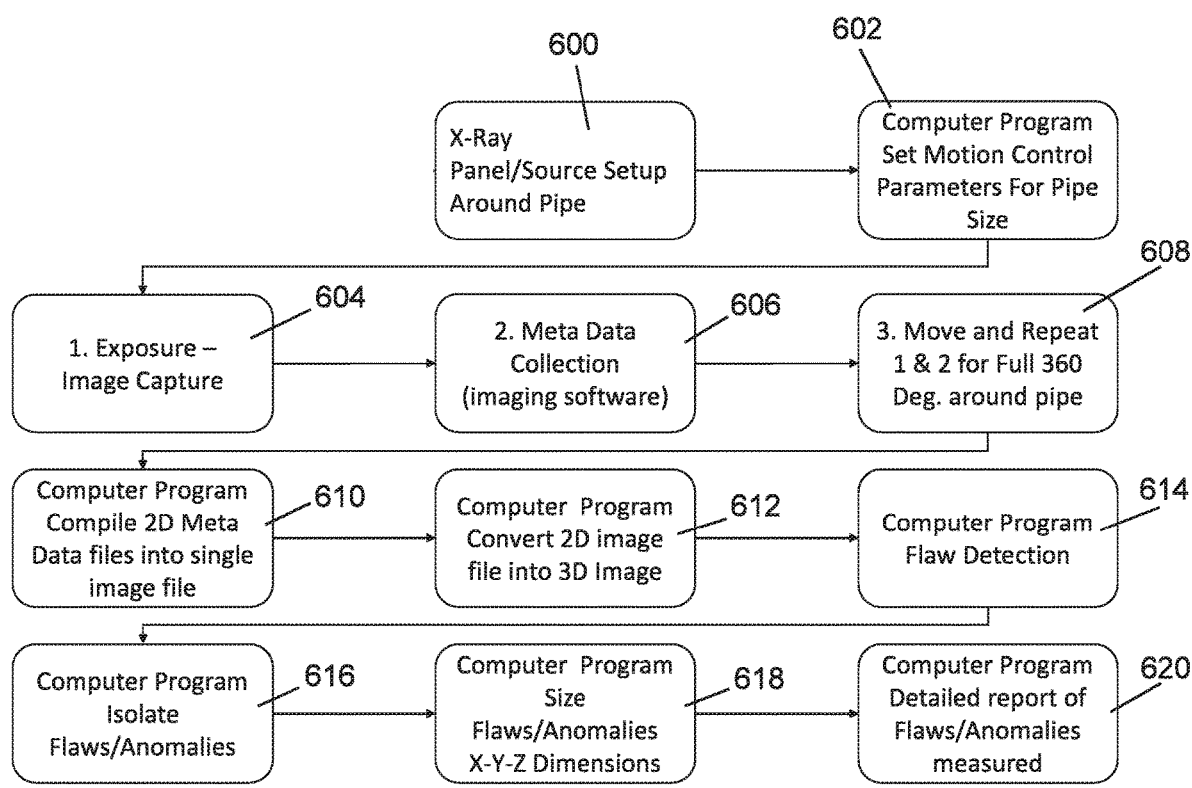
FIG. 12 is a flow chart of a method of inspecting a tubular member according to the present invention.

Turning now to FIG. 12, there is shown a schematic flow sheet generally outlining the method of the present invention. In a first step 600, the apparatus of the present invention is positioned in surrounding relationship to a tubular member, e.g., the pipeline to be inspected. It is significant that with the present invention, in situ inspection of a pipeline can be conducted without the necessity to cut out the section of interest of the pipeline and have it inspected at a remote laboratory site.

In any event, in step 602 a computer program is used to set a motion control parameter of movement of the carousel around the circumference of the tubular member, the computer program being operable to set motion control parameters based on the size of the tubular member. In step 604, a first two dimensional x-ray image is taken at a first position on the periphery of the tubular member. In step 606, using suitable image software, metadata representative of the two dimensional image is collected and stored, steps 604 and 606 being repeated as indicated in step 608 for a full 360° rotation around the tubular member. In step 610 the collected metadata is merged into a single image stack. In step 612, computer software converts the merged two dimensional image stack into a three dimensional image. In step 614, rendering software or other suitable software generates a three dimensional image of any suspicious areas on the tubular member. In step 616, the computer program isolates specific flaws/anomalies which may be present in the suspicious areas and which deserve further analysis. In step 618 the computer program sizes the flaws/anomalies to provide X-Y-Z dimensions of the flaws/anomalies. In step 620, the computer program provides a detailed report of the flaws/anomalies measured including their X-Y-Z morphology. It will be readily apparent that the flaws/anomalies and their morphology/dimensional characteristics can be displayed in real time at the site of the inspection or at a suitable remote location.

Although specific embodiments of the invention have been described herein in some detail, this has been done solely for the purposes of explaining the various aspects of the invention, and is not intended to limit the scope of the invention as defined in the claims which follow. Those skilled in the art will understand that the embodiment shown and described is exemplary, and various other substitutions, alterations and modifications, including but not limited to those design alternatives specifically discussed herein, may be made in the practice of the invention without departing from its scope.

What is claimed is:

1. An apparatus for analyzing flaws in a tubular member, comprising:
    a frame having first and second axially spaced side sections, each of said first and second side sections having first and second segments, said frame being adapted to be positioned around a tubular member; and
    a carousel rotatably mounted on said frame and adapted to be positioned around said tubular member, said carousel having third and fourth axially spaced side sections, each of said third and fourth side sections having fifth and sixth segments, said frame and said carousel both being annular and concentric with one another;
    an x-ray source mounted on said carousel;
    a flat panel x-ray detector mounted on said carousel at a distance circumferentially spaced from said x-ray source; and
    a drive assembly mounted on said frame and operatively connected to said carousel to rotate said carousel relative to said frame.

2. The apparatus of claim 1, further comprising:
    a first plurality of circumferentially spaced, selectively operable tubular member grippers connected to said first side section of said frame; and
    a second plurality of circumferentially spaced, selectively operable tubular member grippers connected to said second side section of said frame.

3. The apparatus of claim 1, wherein said fifth and sixth segments from each of said third and fourth side sections are hingedly connected.

4. The apparatus of claim 1, wherein said drive assembly comprises a first motor operatively connected to said third side section of said carousel.

5. The apparatus of claim 4, wherein there is a second motor operatively connected to said fourth side section of said carousel.

6. The apparatus of claim 4, wherein there is a first gear train connecting said first motor to said third side section of said carousel.

7. The apparatus of claim 6, wherein said first gear train comprises a first spur gear connected to said first motor and a first ring gear connected to said third side section of said carousel.

8. The apparatus of claim 6, wherein there is a second gear train connecting a second motor to said fourth side section of said carousel.

9. The apparatus of claim 8, wherein said second gear train comprises a spur gear connected to said second motor and a ring gear connected to said fourth side section of said carousel.

10. The apparatus of claim 6, wherein said first gear train comprises a first worm drive having a worm screw and a worm wheel.

11. The apparatus of claim 10, wherein a second gear train comprises a second worm drive having a worm screw and a worm wheel.

12. The apparatus of claim 10, wherein first and second beveled gears drivingly connect said worm screw of said first worm drive to said motor.

13. The apparatus of claim 12, wherein third and fourth beveled gears drivingly connect a worm screw of a second worm drive to said motor.

14. The apparatus of claim 1, wherein said x-ray source is selectively movable on an axis transverse to said third and fourth side sections of said carousel.

15. The apparatus of claim 1, wherein said flat panel x-ray detector is selectively movable radially inwardly and radially outwardly with respect to said third and fourth side sections of said carousel.

16. The apparatus of claim 15, wherein said flat panel x-ray detector is selectively movable in a second direction parallel to said third and fourth side sections of said carousel.

17. A method of analyzing flaws in a tubular member having a wall with an inner wall surface and an outer wall surface, comprising:
   1) positioning a frame around the outer wall of said tubular member, said frame including a rotatable carousel in surrounding relationship to said tubular member, said frame and said carousel both being annular and concentric with one another;
   2) mounting an x-ray source on said carousel;
   3) mounting a flat panel x-ray detector on said carousel at a distance circumferentially spaced from said x-ray source;
   4) taking a first two dimensional x-ray image at a first position on said tubular member;
   5) storing said first image in a database;
   6) repeating steps 4) and 5) in successive intervals of carousel rotation over a predetermined arc of the outer wall of said tubular member to produce a multiplicity of two dimensional images, said arc being at least semi-circular;
   7) merging said multiplicity of two dimensional images into a single two dimensional image stack;
   8) converting said single two dimensional image stack into a three dimensional image;
   9) analyzing said three dimensional image to isolate any flaw in said tubular member; and
   10) computing the three dimensional characteristics of said flaw.

* * * * *